United States Patent Office 2,901,324
Patented Aug. 25, 1959

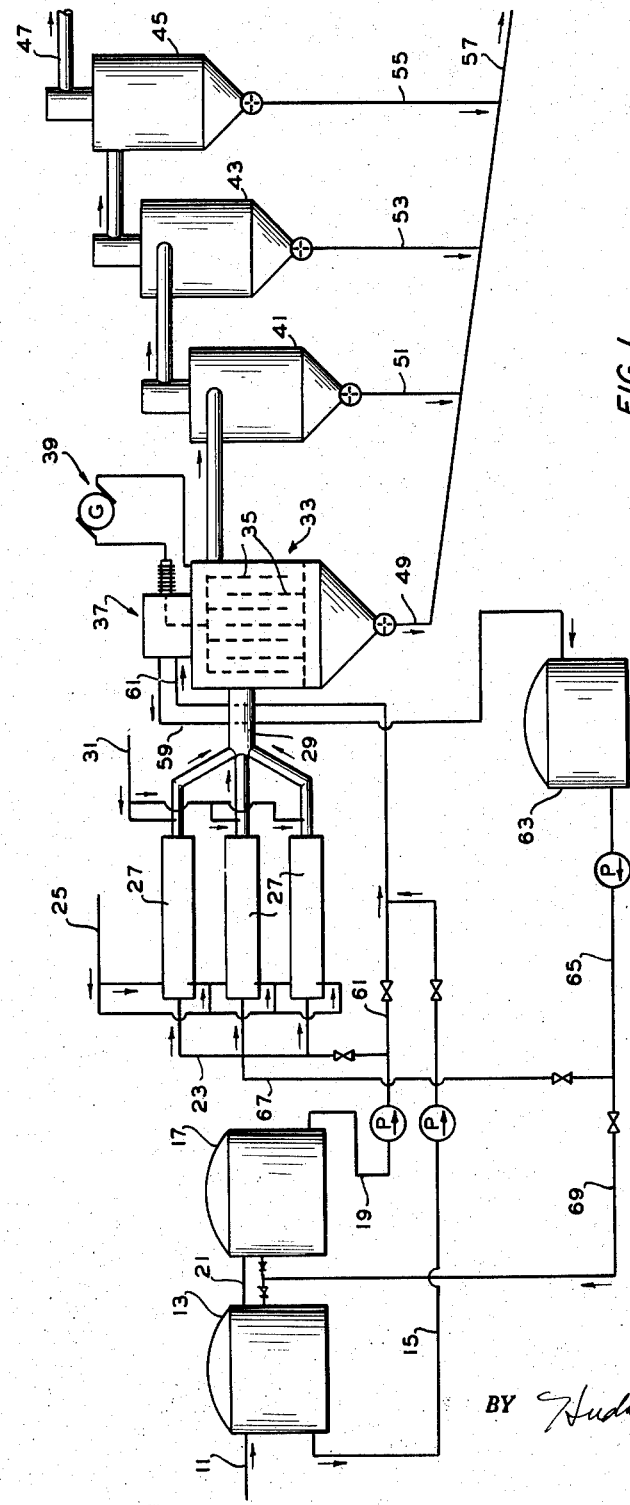
FIG. I
INVENTOR.
R. C. HOWELL
BY *Hudson & Young*
ATTORNEYS

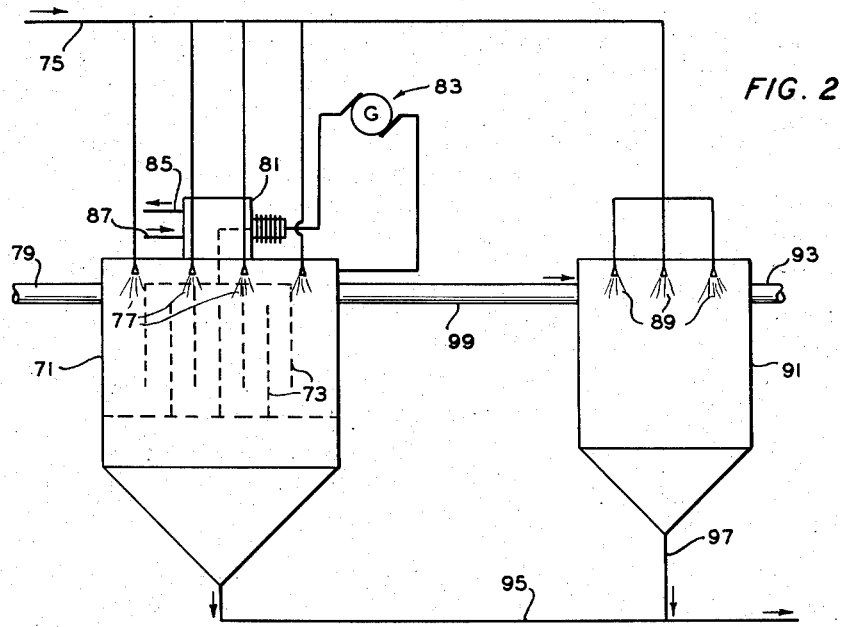
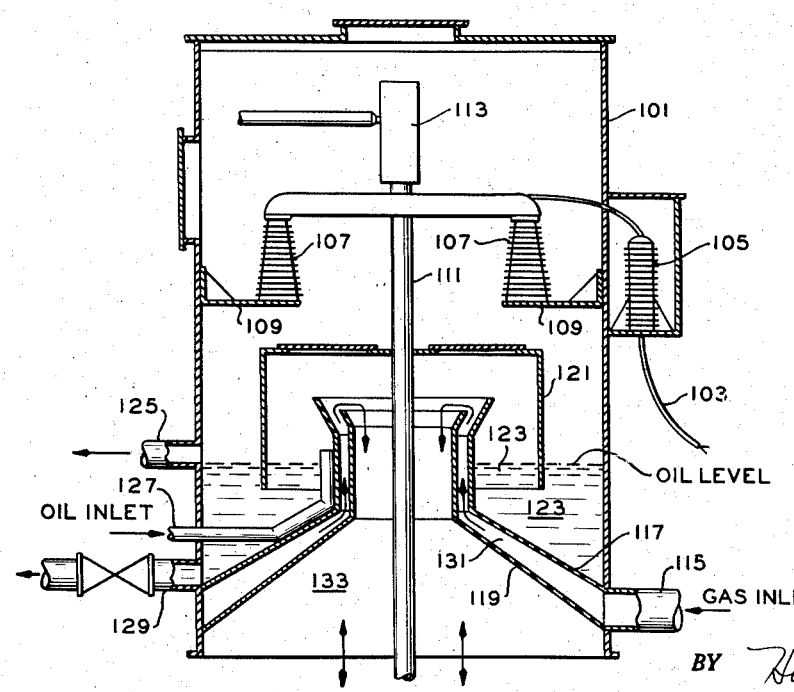

2,901,324

OIL SEAL FOR ELECTRO-PRECIPITATORS EMPLOYED IN CARBON BLACK PROCESSES

Robert C. Howell, Borger, Tex., assignor to Phillips Petroleum Company, a corporation of Delaware Application December 12, 1952, Serial No. 325,642

15 Claims. (Cl. 23—209.6)

This invention relates to electro-precipitators. In one aspect it relates to an improved oil seal for keeping dust away from the electrical connections of electro-precipitator. In still another aspect it relates to a method for keeping carbon black dust away from electrical equipment in electro-precipitators used for separating carbon black from carbon black production furnace effluent gases.

In the operation of Cottrell precipitators for separating carbon black from gases, it has been customary to use an oil seal to keep the carbon containing smoke away from the electrical equipment. If the smoke is allowed to contact the electrical equipment, short circuits may occur, which may burn conductors or may overheat post insulators. In many industries where Cottrell precipitators are used, it is practical to recirculate the sealing oil after filtering or settling out contaminating solids. However, in the operation of carbon black plants, it has been found that oil becomes contaminated with carbon black and that this carbon black will not settle out, and it is extremely difficult, if not impossible, to filter from the oil. This type of contamination makes it necessary to add continuously new oil and to remove some, or all of the old oil at frequent intervals. Even though this practice is followed, it has been found that there are about two short circuits per month. When a short circuit does occur, it is necessary to shut down the precipitator and to drain the oil from the seal, flush out the tank seal, and refill with new oil. This operation is not only a costly and time consuming task, but it also eliminates the use of a precipitator for 4 to 6 hours during the cleaning operation, which materially effects plant efficiency.

In the past, it has been the practice to add an inert gas to blanket the oil in the oil seal and to create a positive pressure which should keep gases containing carbon black from entering the oil seal. Combustion gases have been used for this purpose but have not proven entirely satisfactory, since occasionally the combustion gas generator may fail and permit carbon black containing gases to contact the oil. Further, natural gas may need to be purchased in order to produce clean combustion gases for this sealing operation. By the practice of my invention, this inert blanketing gas is not required. Another disadvantage in using inert combustion gases which are frequently at a relatively high temperature is that these gases heat the sealing oil and cause a loss in sealing oil by vaporization. Not only is there a loss in the volume of the sealing oil, but this evaporated oil is deposited on the electrical equipment and on the carbon black, and oil on carbon black may be disadvantageous when the black is used for some purposes. When oil is deposited on the post insulators in the electrical compartment the way is laid open for short circuits, which may cause additional precipitator trouble.

Another disadvantage in using the inert gas is that the gas stream passes into the gas containing carbon black in the Cottrell precipitator and increases the volume of gases to be processed. In addition, this hot inert gas frequently increases the temperature of the gas in the Cottrell precipitator from 25° to 50° F.

It has been found in practice that the use of inert sealing gas does not eliminate but merely retards the seal oil contamination.

I have found that by using the charge oil to the carbon black furnace reactors in the oil seal of Cottrell precipitators as a continuous stream, that precipitators are able to operate long periods of time with greatly minimized oil seal trouble. In carrying out my invention, I pump oil from the oil storage tank directly into the oil seal compartment of a Cottrell precipitator and allow oil to overflow therefrom into a small surge tank. From this small surge tank this used oil may be pumped directly into the oil stream passing to the carbon black production furnaces, or the oil may be passed into the original or another oil storage tank. In this manner the clean oil is always being passed into the sealing apparatus and no opportunity is given for contaminated oil to remain in the sealing compartment.

An object of my invention is to provide an effective sealing means to keep dust away from the electrical equipment of electro-precipitators.

Another object of this invention is to provide means to maintain an effective oil seal to keep dust away from the electrical equipment of electro-precipitators. Still another object of this invention is to provide an inexpensive and trouble-free means to keep dust away from the electrical equipment of electro-precipitators.

Yet another object of this invention is to provide a method for maintaining an effective oil seal to keep carbon black from the gases being treated away from the high potential electrical equipment or electro-precipitators operating on carbon black containing gases.

Still other objects and advantages of my invention will be realized upon reading the following disclosure which taken with the attached drawing, forms a part of this specification.

In the drawings,

Figure 1 represents diagrammatically one form of apparatus useful in carrying out the process of my invention in a carbon black manufacturing plant.

Figure 2 illustrates diagrammatically another form of apparatus for use in practicing my invention.

Figure 3 illustrates diagrammatically a portion of the apparatus of Figures 1 and 2.

Referring now to the drawing and specifically to Figure 1, reference numeral 11 identifies the conduit for leading oil to be used for the production of carbon black from a source, not shown, into a storage tank 13. A pipe 21 provides for the overflowing of settled oil from storage tank 13 to storage tank 17. From tank 17 a line 19 conducts oil to the manifold pipe 23 for passage of feed oil to carbon black production furnaces 27. Free oxygen-containing gas such as air, or air with a combustible gas, is introduced through a manifold line 25 for heating up the furnaces or for maintaining furnace temperature during operation. The manifold pipe 31 conducts water from storage, not shown, for spray quenching the furnace effluent gases and carbon black. Furnace effluents are collected into a pipe 29 for passage to an electro-precipitator 33. This precipitator is provided with electrodes 35 for imparting electric charges to the carbon black particles for agglomeration purposes. Electric current under high potential is conducted from a source 39 to a wall of the vessel 33 and to an oil seal compartment 37. Gases partially depleted of their carbon black content are passed into a cyclonic separator 41 for further recovery of carbon black. If desired, an additional cyclonic separator 43 is provided for further recovery of carbon black. If so desired, other means such as bag filters may be provided for recovering the final traces of carbon black from the effluent gases from the second cyclonic separator 43. Such a bag filter apparatus illustrated is diagrammatically identified by reference numeral 45. Off-gas from separator 45 passes through conduit 47 to the atmosphere or to such other disposal as desired. Conduits 49, 51, 53 and 55 are provided for passing carbon black from the respective separation equipment into a common carbon black header conduit 57. The carbon black passes through this header conduit 57 to storage or such other disposal as desired.

A pipe 61 is attached to pipe 19 as shown for passage of the portion of the oil feed en route to the furnaces to the oil seal apparatus 37. Overflow oil from this seal apparatus leaves by way of a line 59 and flows into the surge tank 63. From this surge tank the oil is pumped through lines 65 and 69 into the second of the two oil storage tanks. If, however, it is desired to pass the used seal oil directly to the carbon black production furnaces, this oil is passed from surge tank 63 through pipe 65 and through a pipe 67 into the distributor pipe 23 for passage into the carbon black reactors 27.

In the operation of the embodiment of apparatus illustrated in Figure 1, carbon black producing reactors 27 may be operated in accordance with that U.S. Patent 2,375,795. According to the method of operation, oil for producing carbon black is introduced axially into carbon black furnaces and a free oxygen-containing gas, such as air, is introduced into the furnaces tangentially or in conjunction with a combustion supporting gas.

Water for quenching purposes is passed through pipe 31. The combined furnace effluent gases containing carbon black in suspension are passed through conduit 29 into the electro-precipitating apparatus 33. This electro-precipitator is that conventionally used in furnace carbon black producing plants. The operation of the cyclonic separators 41 and 43 and of the bag filter apparatus 45 is well understood in the art.

According to my invention, I pass a portion of the carbon black furnace feed oil from line 19 through line 61 into the oil seal chamber 37. This overflow oil from the seal apparatus flows into a surge tank 63 and through pipe 65 and it may be passed through line 69 into the oil storage tank 17 or it may be through line 67 for combining with the oil feed in line 23 to the furnaces. However, if so desired, oil from the first oil storage tank 13 may be passed through lines 15 and 61 for passage into the oil seal chamber 37. According to this embodiment, the used oil flowing through pipe 65, and pipes 69 or 67 does not contaminate the oil in the original storage tank 13.

Figure 2 of the drawing illustrates in diagrammatic form an embodiment of the electro-precipitator in which the precipitation occurs in the presence of an oil spray or water spray. The shell or container 71 of this precipitator is more or less similar to that of the precipitator illustrated in Figure 1. Electrodes 73 are provided in this precipitator in a conventional manner. Conduit 79 is provided for passage of gases containing carbon black in suspension into this precipitator and a conduit 99 is provided for passage of gases from this precipitator to a spray vessel 91. A conduit 93 is attached to vessel 91 for disposal of emerging gases. A conduit 75 is provided for passage of water or oil or other spraying medium from a source, not shown, to this apparatus. Sprays 77 are provided in the vessel 71 and sprays 89 are provided in vessel 91. Solid matter as a slurry is passed through a conduit 97 into conduit 95 for passage to storage or for such disposal as desired.

On top of precipitator 71 is provided an oil seal vessel 81 similar to that illustrated in reference to Figure 1. Electricity from source 83 is conducted to the precipitator vessel in a conventional manner. A pipe 87 is provided for passage of seal oil according to my invention into the seal chamber 81 while a pipe 85 is provided for removal of oil therefrom.

In reference to Figure 3 of the drawing, this figure illustrates in the diagrammatic form the construction of the oil seal vessels 37 and 81 of Figures 1 and 2, respectively.

In reference to Figure 3, the sealing vessel is illustrated as bounded by walls 101. Such a vessel, when installed on top of a precipitator vessel, is open thereto as indicated by the double-ended arrows at the bottom of this figure. Element 117 is a bottom and inner side wall and with the vertical wall 101 form a container to hold a lake of sealing oil 123. Electrical lead 103 conducts electricity from a source of high potential electricity into the vessel and is supported by an insulator 105. A high potential current is conducted down an electrode support element 111 to the multiple electrodes, not shown. Insulators 107 provide supports for this electrode element 111. Apparatus 113 may be termed a "high tension rapper" for knocking or jarring carbon black from the electrodes. A bell 121 is attached rigidly to the shaft 111 and the lower edge of the bell extends into the lake of oil 123 as illustrated. In this manner carbon black from space 133 cannot flow into the upper space and be deposited upon the electrical apparatus.

To illustrate a prior method of keeping the seal oil in a relatively clean condition, structural element 119 similar in general conformity to element 117 is provided as shown. Elements 117 and 119 provide an annular space therebetween through which inert gas from line 115 is passed. This clean inert gas passes through line 115, space 131 and exits at the point near the surface of the lake of oil 123 within the bell vessel 121. In this manner, since there is a constant flow of this inert gas, these gases act as a sweeping medium and maintain the constant flow from the space under the bell 121 downward and into the electro-precipitator. In this manner it was intended that by passing inert gases in a downward direction through this sealing apparatus that solid material could not enter the oil. As mentioned hereinbefore, it was found that such an arrangement was effective only in part but that some contaminating material still found its way into the sealing oil. The pipe 127 is provided for introduction of sealing oil into this sealing apparatus while the conduit 125 is provided for overflow oil to leave the sealing vessel. A conduit 129 is provided for draining sealing oil from the apparatus in case a complete change of oil is ever desired.

As mentioned hereinbefore, any one of several embodiments of flow of oil from oil storage to the sealing vessel of the precipitator may be employed as desired. However, I find that it is preferable to pass oil from storage tank 17 through line 19 and by pass a portion from the feedline 23 through line 61 into the sealing apparatus 37. In the return flow, as preferred in this embodiment, the oil passes through the overflow line 59 to the surge tank 63 and flows through lines 65 and 69 back into the original oil storage tank 17. I find upon passing used sealing oil into the original oil storage tank that the contamination of the carbon black production charge oil supply is very, very slight indeed. The volume of the oil in storage tank 17 is so large in comparison to the volume of oil passed through the sealing equipment that, as mentioned above, contamination of the oil in tank 17 is negligible.

While if oil being used in the seal originates from either of the oil storage tanks 13 or 17, if the used sealing oil is passed through lines 65 and 67 and is consumed immediately in the furnaces, no contamination whatever enters the oil storage tank 17.

In the embodiment illustrated in Figure 1 of the drawing, the electrical precipitator 33 may be a dry precipitator apparatus and one or more of the separators 41, 43 or 45 may be dry separators or wet separators as desired, the only requirement being, if the portion of these separators are operated as wet separators, the carbon black slurry produced therefrom should obviously be collected separately from dry carbon black collected in dry separators and in dry electro-precipitators.

While certain embodiments of the invention have been described for illustrative purposes, the invention obviously is not limited thereto.

I claim:

1. A method for operating a furnace carbon black production operation comprising dividing a carbon black furnace charge oil stream from a carbon black furnace charge oil storage zone into two portions, continuously introducing one portion into a furnace carbon black production zone, removing effluent gases containing carbon black in suspension from said production zone and introducing same into a high electrical potential carbon black agglomeration zone, introducing the other portion of said charge oil stream into an oil sealing zone in fluid sealing relation between said agglomeration zone and a high potential electrical terminal containing zone, withdrawing said charge oil from said oil sealing zone and introducing the withdrawn oil into said oil storage zone, and removing effluent gases and agglomerated carbon black as separate products from said agglomeration zone.

2. A method for operating a furnace carbon black production operation comprising introducing a carbon black furnace charge oil from a first oil storage zone into a furnace carbon black production zone, removing effluent gases containing carbon black in suspension from said production zone and introducing same into a high electrical potential carbon black agglomeration zone, introducing a carbon black furnace charge oil from a second oil storage zone into an oil seal zone in liquid sealing relation between said agglomeration zone and a high potential electrical terminal containing zone, withdrawing said charge oil from said oil seal zone and introducing same into said furnace carbon black production zone, and removing effluent gases and agglomerated carbon black as separate products from said agglomeration zone.

3. A method for operating a furnace carbon black production operation comprising continuously introducing charge oil from an operation subsequently described into a furnace carbon black production zone, removing effluent gases containing carbon black in suspension from said production zone and introducing same into a high potential electrical carbon black agglomeration zone, continuously withdrawing a carbon black furnace charge oil from an oil storage zone and introducing same into an oil seal zone in liquid sealing relation between said agglomeration zone and a high potential electrical terminal containing zone, continuously withdrawing said charge oil from said oil seal zone as said charge oil from an operation subsequently described, and recovering agglomerated carbon black and effluent gases as separate products from said agglomerating zone.

4. A method for operating a furnace carbon black production operation wherein carbon black is recovered from furnace effluents in a high potential electro-precipitator, the improvement comprising introducing carbon black furnace charge oil into an oil seal zone in liquid sealing relation between the electrical precipitation zone and the high potential electrical terminal containing zone of said precipitator, withdrawing charge oil from said oil seal zone and introducing charge oil comprising the oil withdrawn from said oil seal zone into the carbon black production furnace of said furnace carbon black production operation.

5. In the method of claim 4 wherein the high potential electroprecipitator is a dry process precipitator.

6. In the method of claim 4 wherein the high potential electro-precipitator is a wet, spray type precipitator.

7. In the method of claim 1 wherein the high electrical potential carbon black agglomeration zone is a dry process electro-precipitation zone.

8. In the method of claim 1 wherein the high electrical potential carbon black agglomeration zone is a wet, spray type electro-precipitation zone.

9. A method for operating a furnace carbon black production operation, comprising introducing a first stream of carbon black furnace feed oil into a furnace carbon black production zone, removing effluent gases containing carbon black in suspension from said production zone and introducing same into a high electrical potential carbon black agglomeration zone, introducing a second stream of a carbon black furnace feed oil into an oil sealing zone in fluid sealing relation between said agglomeration zone and a high potential electrical terminal containing zone, continuously withdrawing said second stream of oil from said oil sealing zone, introducing the withdrawn oil into said furnace carbon black production zone, and removing effluent gases and agglomerated carbon black as separate products from said agglomeration zone.

10. A method for operating a furnace carbon black production operation, comprising dividing a stream of carbon black furnace feed oil into two portions, introducing one portion into a furnace carbon black production zone, removing effluent gases containing carbon black in suspension from said production zone and introducing same into a high electrical potential carbon black agglomeration zone, continuously introducing the other portion of said carbon black furnace feed oil into an oil sealing zone in fluid sealing relation between said agglomeration zone and a high potential electrical terminal containing zone, continuously withdrawing said other portion of said feed oil from said oil sealing zone and introducing the withdrawn oil into said furnace carbon black production zone, and removing effluent gases and agglomerated carbon black as separate products from said agglomeration zone.

11. A method for operating a furnace carbon black production operation wherein carbon black is recovered from furnace effluent in a high potential electro-precipitator, the improvement comprising introducing carbon black furnace charge oil into an oil seal zone in liquid sealing relation between the electrical precipitation zone and the high potential electrical terminal containing zone of said precipitator, withdrawing said charge oil from said oil seal zone and introducing same into said furnace carbon black production operation.

12. A method for operating a furnace carbon black production operation comprising dividing a furnace carbon black charge oil stream from an oil storage zone into two portions, introducing one portion into a furnace carbon black production zone, removing effluent gases containing carbon black in suspension from said production zone and introducing same into a high electrical potential carbon black agglomeration zone, introducing the other portion of said charge oil stream into an oil sealing zone in fluid sealing relation between said agglomeration zone and a high potential electrical terminal containing zone, withdrawing said charge oil from said oil sealing zone and introducing the withdrawn oil into said furnace carbon black production zone, and removing effluent gases and agglomerated carbon black as separate products of the process from said agglomeration zone.

13. A method for operating a furnace carbon black production operation comprising dividing a carbon black furnace charge oil stream from a first oil storage zone into two portions, introducing one portion of said charge oil into a furnace carbon black production zone, removing effluent gases containing carbon black in suspension from said production zone and introducing same into a high electrical potential carbon black agglomeration zone, introducing the other portion of said charge oil into an oil sealing zone in fluid sealing relation between said agglomeration zone and a high potential electrical terminal containing zone, withdrawing said charge oil from said oil sealing zone and introducing same into a second oil storage zone, passing oil from said second oil storage zone into said first oil storage zone, and removing effluent gases and agglomerated carbon black as separate products from said agglomeration zone.

14. In the method of claim 13 wherein the high electrical potential carbon black agglomeration zone is a dry process electro-precipitation zone.

15. In the method of claim 13 wherein the high electrical potential carbon black agglomeration zone is a wet, spray type electro-precipitation zone.

References Cited in the file of this patent

UNITED STATES PATENTS

| Re. 22,886 | Ayers | June 3, 1947 |
| 1,765,991 | Miller | June 24, 1930 |
| 2,597,232 | Eckholm et al. | May 20, 1952 |

OTHER REFERENCES

Porter: "Petroleum Dictionary," 3rd ed., 1930, p. 247, Gulf Publ. Co., 3301 Buffalo Drive, Houston, Texas.